June 1, 1948.  R. W. SHARTLE  2,442,713
WIRE FLEXURE TESTING APPARATUS
Filed Oct. 12, 1945  2 Sheets-Sheet 1

INVENTOR
RALPH W. SHARTLE
BY
ATTORNEY

Patented June 1, 1948

2,442,713

UNITED STATES PATENT OFFICE 2,442,713

WIRE FLEXURE TESTING APPARATUS

Ralph W. Shartle, Clayton, Mo., assignor to Wagner Electric Corporation, St. Louis, Mo., a corporation of Delaware Application October 12, 1945, Serial No. 622,007

4 Claims. (Cl. 73—100)

My invention pertains to apparatus for testing the resistance of fabricated material to bending forces, one application being determination of the "stiffness" of wire for use in forming current conducting windings of electrical apparatus. Wire manufactured for this purpose, although of the same size and resistance, may differ in mechanical characteristics with the result that some may be sufficiently stiff that it would be difficult to bend it to the shape required for application or use as a coil of an electrical device and it is, therefore, desirable that a wire manufacturer have means for determining whether wire being formed has suitable bending characteristics and that wire users have means for testing the wire supplied to determine its compliance with specifications in this particular.

The object of my invention is to provide an accurate and reliable apparatus for the purpose indicated.

Figure 1:
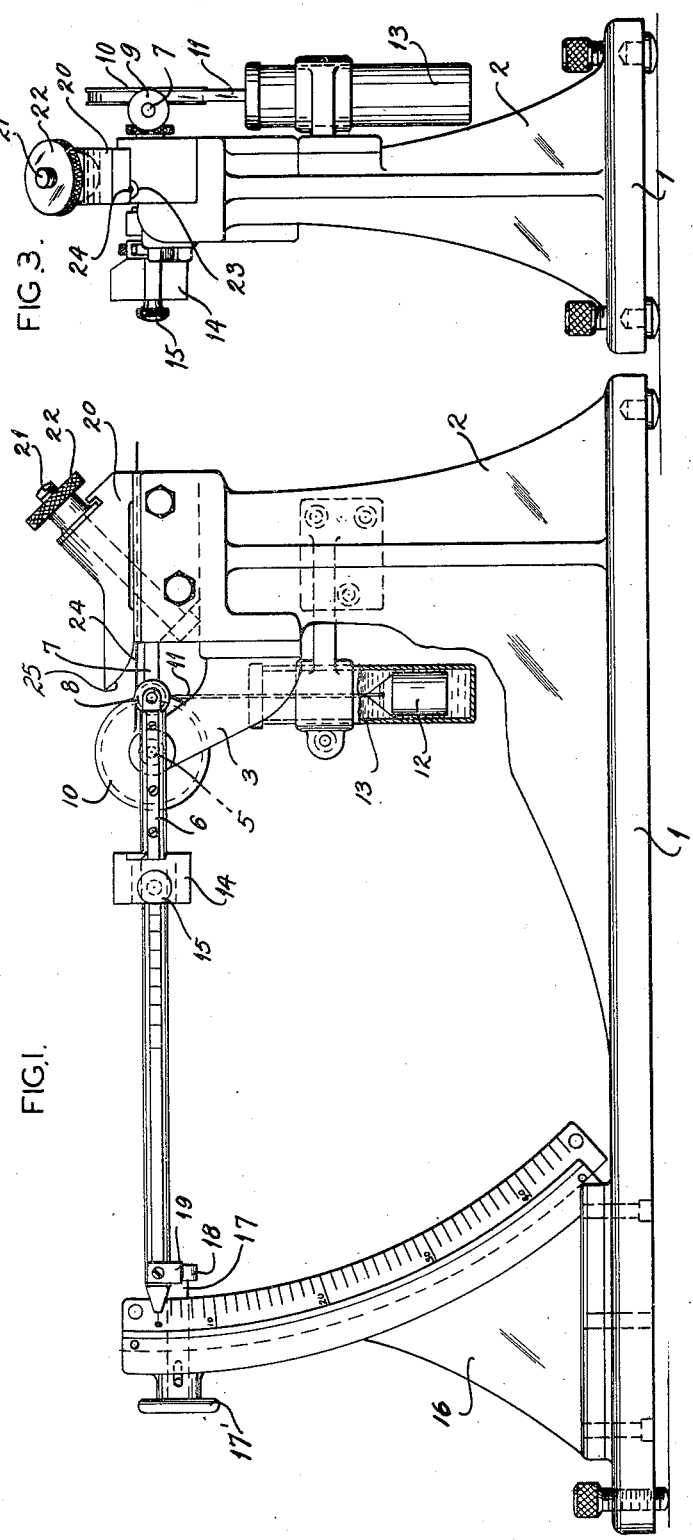
Figure 2:
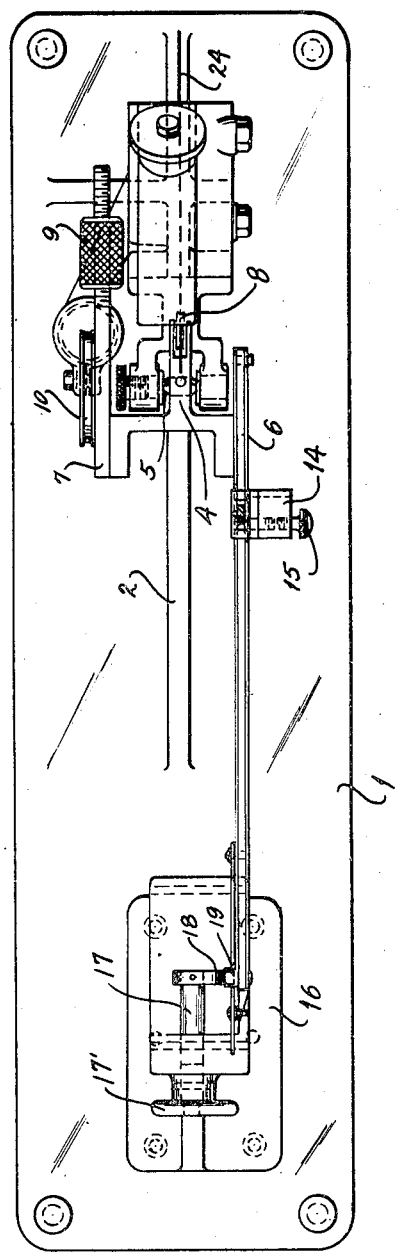

In the accompanying drawings Figure 1 is a side elevation; Figure 2 is a top plan view; and Figure 3 is an end elevation, of a testing apparatus embodying my invention.

The bed plate 1 carries a pedestal 2 which is provided with a bifurcated arm 3. Element 4 is journaled on arm 3 by means of the conical ended pin 5 and is provided with a forked extension to one side of which is attached beam 6 and to the other side beam 7. On the end of element 4 adjacent the pedestal is mounted a wire engaging wheel 8. Beam 7 carries an adjusting counterweight 9 (preferably in threaded relation therewith) and non-rotatively attached to beam 7 is a circular element 10 to which is attached a flexible metal ribbon 11 bearing on the periphery of the circular element. To the lower end of this ribbon is secured a weight 12, which weight is positioned in a cylinder 13 mounted on the pedestal. The cylinder is filled with light oil and its internal diameter is such with respect to the diameter of the weight that the latter can move freely in a vertical direction in the oil. The oil has a "dashpot" effect in that it retards the movement of the weight and thus prevents the occurrence of any "hammer blow" action on the wire during a bending test. By the support means described the torque applied to the beam by the weight 12 is maintained constant for all positions of the beam.

The beam 6 carries a weight 14 longitudinally movable thereon and, if desired, the beam may be supplied with graduations as indicated, whereby the weight may be readily located at any desired position on beam 6 and secured in such position by the clamping screw 15.

The bed plate 1 is also provided with a pedestal 16 carrying an indicating scale which cooperates with the end of beam 6. Means are provided for holding the beam in zero position, the means shown in the drawing being a sliding rod 17 having a manual operating knob 17' at one end and a lateral projection 18 at the other end which, in the position shown in Figure 1, is beneath the laterally extending element 19 secured to the beam. The pin and slot connection between pedestal 16 and the slidable rod indicated in the drawing, limits the lateral motion of the rod.

The upper end of the pedestal 2 is provided with a clamping surface with which the lower surface of the wire clamping shoe 20 cooperates, these surfaces being securable in clamping relation by bolt 21 and clamping nut 22. For the purpose of a definite location of the wire between the clamping surfaces, the surface on the pedestal is provided with a wire receiving groove 23. As indicated by the line 24 the wire to be tested is positioned to project from the clamping surfaces through the groove in the surface of wheel 8 and sufficiently beyond the wheel that it will remain in contact therewith throughout the motion of beam 6 while bending strain is being applied. As indicated, the wire will be bent against the curved forward surface 25 of the clamping shoe 20.

In the operation of the apparatus described the first step is to ascertain whether beam 6 is in balance with weight 14 in its zero position, the forward end of the beam being released for movement by withdrawal of the stop piece 18 out of engagement with part 19 on the beam and lack of balance, if any, being corrected by means of the balancing weight 9. After balancing the beam, stop 18 is again positioned under part 19 to retain the beam in zero position. The wire to be tested is then clamped in position, as previously described, and the weight 14 moved to and secured at a previously selected position on beam 6. The stop 18 is then withdrawn and the weight rotates the beam against the resistance to bending of the wire to be tested, this rotation being damped by the dashpot action of weight 12 which moves upward through the oil in cylinder 13. The point at which the forward end of the beam comes to rest, as indicated by the scale on pedestal 16, determines whether the stiffness of the wire is within the desired limits as determined by previous tests with the same apparatus of wire having satisfactory bending resistance.

It will be noted that in the apparatus described the actual bending torque applied to the wire at each position of the beam during its movement, will be the same under all tests made while weight 14 remains in a single operative position on the beam since the dashpot retardation of the beam during the bending of the wire eliminates increase of weight momentum as the result of acceleration of motion during the bending operation and, therefore, any consequent "hammer" action.

Since the wire is bent over a curved surface the degree of bending at a particular point thereon is limited and the curvature should not be such as to cause a sharper bend to be formed at any point than will be made in winding the tested wire on the electrical apparatus. Test sections from the same or identical coils of wire may vary in bending resistance after having been bent to a substantial extent at one point. By preventing application of extreme stress to the wire at a particular point my apparatus avoids testing errors which might be thus caused and gives true indication of the stiffness of the wire under the degree of bending necessary in applying coils to electrical apparatus.

Having fully described my invention, that which I claim as novel and desire to protect by Letters Patent of the United States is:

1. In apparatus for testing the bending resistance of wire, a pivotally supported beam for applying bending strain to a wire, means forming a fixed curved surface located in the path through which the bending strain applied by the beam tends to move the wire whereby that part of the wire brought into contact with said surface will be bent to conform therewith, a weight for actuating the beam in strain applying direction and longitudinally adjustable on the beam, counterweight means including an adjustable weight element for balancing the beam when the actuating weight element is in a selected position and also including a second weight element, and means for retarding the motion of said second weight element.

2. In apparatus for testing the bending resistance of wire, a pivotally supported beam for applying bending strain to a wire, means forming a fixed curved surface located in the path through which the bending strain applied by the beam tends to move the wire whereby that part of the wire brought into contact with said surface will be bent to conform therewith, a weight for actuating the beam in strain applying direction and longitudinally adjustable on the beam, counterweight means including an adjustable weight element for balancing the beam when the actuating weight element is in a selected position and also including a second weight element, and supporting means for said second weight adapted to maintain the torque of said weight constant for all positions of the beam.

3. In apparatus for testing the bending resistance of wire, a pivotally supported beam for applying bending strain to a wire, means forming a fixed curved surface located in the path through which the bending strain applied by the beam tends to move the wire whereby that part of the wire brought into contact with said surface will be bent to conform therewith, a weight for actuating the beam in strain applying direction and longitudinally adjustable on the beam, counterweight means including an adjustable weight element for balancing the beam when the actuating weight element is in a selected position and also including a second weight element, supporting means for said second weight adapted to maintain the torque of said weight constant for all positions of the beam, and means for retarding the motion of said second weight element.

4. In apparatus for testing the bending resistance of wire, a pivotally supported beam for applying bending strain to a wire, means forming a fixed curved surface located in the path through which the bending strain applied by the beam tends to move the wire whereby that part of the wire brought into contact with said surface will be bent to conform therewith, a weight for actuating the beam in strain applying direction and longitudinally adjustable on the beam, counterweight means including an adjustable weight element for balancing the beam when the actuating weight element is in a selected position and also including a second weight element, supporting means for said second weight adapted to maintain the torque of said weight constant for all positions of the beam, and means maintaining said weight element submerged in a body of liquid throughout its operative range of travel.

RALPH W. SHARTLE.

REFERENCES CITED

The following references are of record in the file of this patent:

UNITED STATES PATENTS

| Number | Name | Date |
|---|---|---|
| 274,146 | Smith | Mar. 20, 1883 |
| 1,573,865 | Robins | Feb. 23, 1926 |
| 2,286,651 | Scott | June 16, 1942 |
| 2,377,590 | Talalay | June 5, 1945 |

FOREIGN PATENTS

| Number | Country | Date |
|---|---|---|
| 24,517 | Great Britain | 1914 |
| 352,599 | Germany | May 3, 1922 |